(12) United States Patent
Yang et al.

(10) Patent No.: US 11,533,671 B1
(45) Date of Patent: Dec. 20, 2022

(54) TECHNIQUES FOR DYNAMIC DISTANCE CONTROL FOR CONTENTION-BASED FORWARDING

(71) Applicant: QUALCOMM Incorporated, San Diego, CA (US)

(72) Inventors: Seung Ryul Yang, San Diego, CA (US); Vincent Douglas Park, Alexandria, VA (US)

(73) Assignee: QUALCOMM Incorporated, San Diego, CA (US)

(*) Notice: Subject to any disclaimer, the term of this patent is extended or adjusted under 35 U.S.C. 154(b) by 13 days.

(21) Appl. No.: 17/359,296

(22) Filed: Jun. 25, 2021

(51) Int. Cl.
*H04W 40/20* (2009.01)
*H04W 4/40* (2018.01)
*H04W 40/12* (2009.01)
*H04W 40/22* (2009.01)

(52) U.S. Cl.
CPC ............ *H04W 40/20* (2013.01); *H04W 4/40* (2018.02); *H04W 40/12* (2013.01); *H04W 40/22* (2013.01)

(58) Field of Classification Search
None
See application file for complete search history.

(56) References Cited

U.S. PATENT DOCUMENTS

2004/0205105 A1* 10/2004 Larsson ................. H04L 45/00 709/200

FOREIGN PATENT DOCUMENTS

| WO | WO-2008092475 A1 * | 8/2008 | ............ H04L 45/00 |
| WO | WO-2015124746 A1 * | 8/2015 | ........... H04L 45/121 |
| WO | WO-2019031625 A1 * | 2/2019 | ......... H04L 41/0803 |
| WO | WO-2019132083 A1 * | 7/2019 | |

* cited by examiner

*Primary Examiner* — Brian S Roberts
(74) *Attorney, Agent, or Firm* — Holland & Hart LLP

(57) ABSTRACT

Methods, systems, and devices for wireless communications are described. A user equipment (UE) may be configured for contention-based forwarding (CBF) to relay a message toward a destination. The UE may receive signaling indicating a configuration for CBF. The CBF configuration may be associated with a maximum communication range for CBF signaling. The UE may receive a message to relay toward the destination using CBF. The message may include a first indication of a dynamic communication range for the CBF which may be less than or equal to the maximum communication range. The UE may determine a timer value to retransmit the message based on the dynamic communication range. When a timer set to the timer value expires, the UE may retransmit the message to nearby stations and include an indication of the dynamic communication range with the message.

30 Claims, 12 Drawing Sheets

TECHNIQUES FOR DYNAMIC DISTANCE CONTROL FOR CONTENTION-BASED FORWARDING

FIELD OF TECHNOLOGY

The following relates to wireless communications, including techniques for dynamic distance control for contention-based forwarding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A first UE may be configured to relay a message toward a destination UE. The first UE may receive the message and transmit the message to other UEs within range according to some message relaying or message forwarding techniques. In some cases, the UE may be restricted to transmitting the message to a different range than a theoretical maximum range. Some message forwarding techniques can be improved.

SUMMARY

The described techniques relate to improved methods, systems, devices, and apparatuses that support techniques for dynamic distance control for contention-based forwarding (CBF). Generally, the described techniques provide for dynamically indicating a maximum communication range for CBF signaling. A user equipment (UE) may be configured for CBF to relay a message toward a destination. The UE may receive signaling indicating a configuration for CBF, and the CBF configuration may be associated with a maximum communication range (e.g., a theoretical maximum communication range) for CBF signaling. The UE may receive a message to relay toward the destination using CBF. The message may include a first indication of a dynamic communication range for the CBF which may be less than or equal to the maximum communication range. In some cases, the dynamic communication range may correspond to an actual maximum communication range, which may be shorter than the theoretical maximum communication range. The UE may determine a timer value to retransmit the message based on the dynamic communication range. When a timer set to the timer value expires at the UE, the UE may retransmit the message to nearby stations and include an indication of the dynamic communication range with the message.

DETAILED DESCRIPTION

Figure 1:
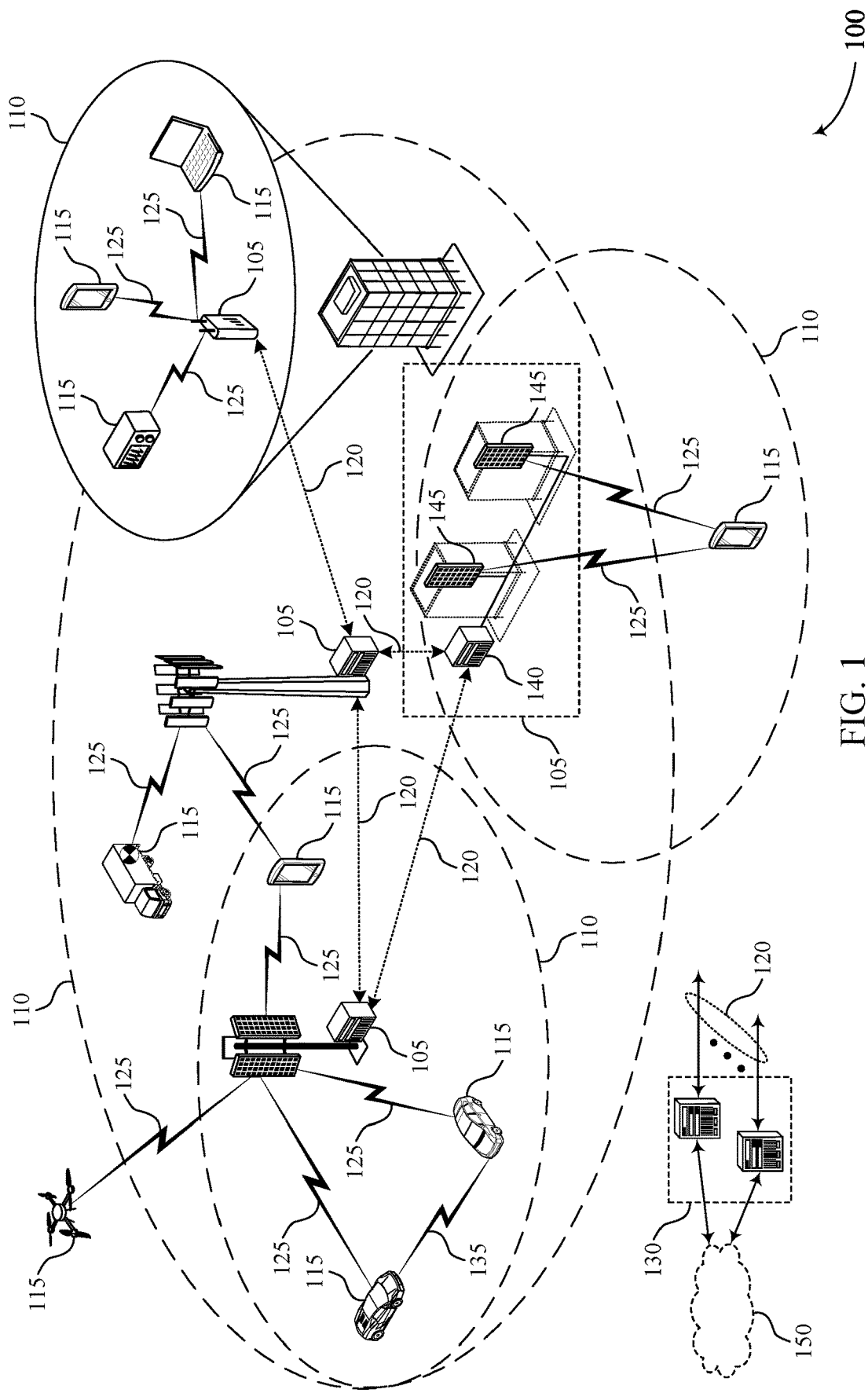
FIG. 1 illustrates an example of a wireless communications system that supports techniques for dynamic distance control for contention-based forwarding (CBF) in accordance with aspects of the present disclosure.

In some wireless communications systems, such as a vehicle-to-everything (V2X) communications system, a user equipment (UE) may be configured to forward or relay a message toward a destination node. For contention-based forwarding (CBF), one such technique of message forwarding, a transmitting station (e.g., UE) may transmit a message to each nearby station. The nearby receiving stations may calculate a wait time for retransmitting the message based on a respective distance from the destination node. For some CBF techniques, the waiting time may correspond to proximity to the destination node or how much progress (e.g., distance traveled) the message made toward the destination. For example, the closer a receiving station is to the destination, the shorter the wait time for that station to retransmit the message. When a receiving station retransmits (e.g., relays) the message, the other stations receive the retransmission and do not retransmit the message. Therefore, the message is retransmitted by the receiving station closest to the destination node, and the other nodes refrain from retransmitting. At a maximum distance traveled, a receiving station may use a lowest timer value to buffer the message before retransmitting.

In some examples, an actual communication range for a wireless communications system implementing CBF may be limited or less than a theoretical maximum communication range. However, the receiving stations may calculate the minimum wait time based on the theoretical maximum communication range. Therefore, despite being at the actual maximum communication range, a nearby receiving station may calculate a wait time based on the theoretical maximum communication range. As such, stations at the actual maximum communication range may calculate a longer wait time. This may introduce a delay for each relayed transmission (e.g., hop) for the CBF.

Wireless communications systems described herein may implement techniques to use a dynamic or actual communication range to determine a buffer timer for CBF. Devices configured for CBF, such as UEs, may calculate a minimum wait time based on a dynamically indicated or actual communication range instead of a theoretical maximum communication range. This may reduce the buffering time for stations within the actual maximum communication range to send the message to a next station. To support these techniques, a station relaying the message may indicate the actual communication range with the message. For example, a transmitting station may include a message header with the message, the header including a field to indicate the dynamic or actual communication range. In some cases, the dynamic communication range may be based on a Quality of Service (QoS) range of the message. For example, some aspects of these techniques may support distance-based groupcast signaling for CBF, which may provide hybrid automatic repeat request (HARQ) functionality to UEs within the QoS range.

Aspects of the disclosure are initially described in the context of wireless communications systems. Aspects of the disclosure are further illustrated by and described with reference to apparatus diagrams, system diagrams, and flowcharts that relate to techniques for dynamic distance control for CBF.

FIG. 1 illustrates an example of a wireless communications system 100 that supports techniques for dynamic distance control for CBF in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at a medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support techniques for message relaying or message forwarding. Message relaying may be supported by various forwarding mechanisms in the wireless communications system 100. For example, the wireless communications system 100 may support address topology-based forwarding, geographical forwarding, etc.

In some cases, the wireless communications system 100 may support different techniques for geographical forwarding. One example of geographical forwarding is greedy forwarding, where a sending station may select one forwarding station out of nearby stations which has a smallest distance to the destination. The sending station may transmit a message to the selected forwarding station, which moves the message toward the destination. Stations may relay the message until the message reaches the destination (e.g., a destination node, destination station, etc.).

For another example of geographical forwarding, the wireless communications system 100 may support CBF. For CBF, a sending station may transmit a message (e.g., a V2X message) to all nearby stations. Stations which receive the message (e.g., receiving stations) may calculate a waiting time for retransmitting the message. The waiting time may be configured such that a receiving station which is closer to the destination may have a shorter waiting time. When a receiving station retransmits the message, the other stations listen to the retransmission and do not retransmit. Therefore, the receiving station closest to the destination may retransmit the message.

A receiving station may receive the message and determine a waiting time or a timer value based on a progress of the message. For example, the receiving station may determine a forwarding progress of the message (e.g., PROG) toward the destination based on a difference between the sender's distance from the destination and a local distance (e.g., a distance of the receiving station) from the destination. The sender position may be obtained from a location table entry (LocTE). The wait time, or timer value, at the receiving station may be between a minimum timer value (e.g., TO_CBF MIN) and a maximum timer value (e.g., TO_CBF_MAX). The minimum timer value may correspond to the minimum duration the packet can be buffered in a CBF packet buffer, and the maximum timer value may correspond to the maximum duration the packet can be buffered in the CBF packet buffer. For example, a receiving station may use Equation (1) to determine a buffer timer value, TO_CBF, for when PROG≤DIST_MAX and use Equation (2) when PROG>DIST_MAX, where DIST_MAX corresponds to a maximum communication range.

$$TO\_CBF = TO\_CBF\_MAX + \frac{TO\_CBF\_MIN - TO\_CBF\_MAX}{DIST\_MAX} * PROG \quad (1)$$

$$TO\_CBF = TO\_CBF\_MIN \quad (2)$$

In some systems, the minimum timer value may be based on a theoretical maximum communication range of the wireless access technology. For example, if the progress is equal to or greater than the theoretical maximum communication range, the receiving station may use the minimum timer value to buffer the message. However, in some cases, an actual maximum communication range may be smaller than the theoretical maximum communication range. For example, the actual maximum communication range may be limited within an urban environment, due to weather conditions, or the use of a distance-controlled transmission technology. Using the theoretical maximum communication range in these scenarios to determine the minimum timer value may increase delays for CBF communications. For example, devices outside of the actual maximum communication range may be unable to receive the relayed message. However, devices at the actual maximum communication range may have a longer wait time than the minimum timer value, as the minimum timer value is configured according to the theoretical maximum communication range. This may introduce delay at each hop or relay of the message.

The wireless communications system 100, and wireless communications systems described herein, may implement techniques to configure a dynamic maximum communication range for message relaying, such as for CBF. For example, a UE 115 may determine a minimum timer value based on a dynamically indicated maximum communication range instead of a theoretical maximum communication range. For example, the wireless communications system 100 may provide techniques to dynamically indicate a DIST_MAX value. For example, the dynamically indicated maximum communication range may be set to an actual maximum communication range or a QoS range, or both.

Figure 2:
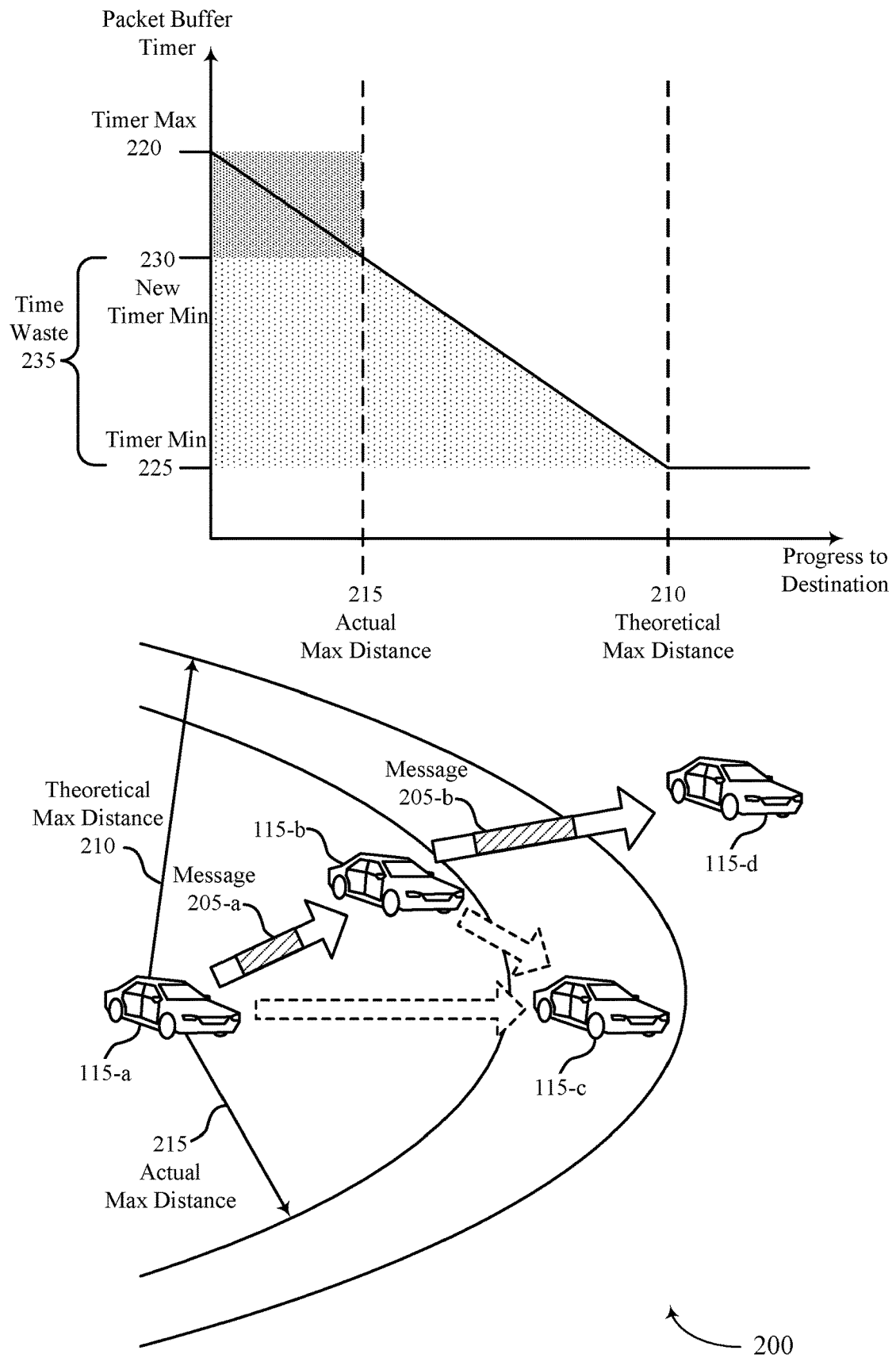
FIG. 2 illustrates an example of a wireless communications system that supports techniques for dynamic distance control for CBF in accordance with aspects of the present disclosure.

FIG. 2 illustrates an example of a wireless communications system 200 that supports techniques for dynamic distance control for CBF in accordance with aspects of the present disclosure. The wireless communications system 200 may be an example of a V2X wireless communications system or a wireless communications system implementing V2X communications. The wireless communications system may include one or more UEs 115, such as UE 115-a, UE 115-b, UE 115-c, and UE 115-d. The UEs 115 may be examples of UEs such as vehicular UEs (V-UEs), pedestrian UEs 115, roadside units (RSUs), TRPs, mobile stations, or other examples of wireless devices.

The wireless communications system 200 may implement techniques for CBF. For CBF techniques, a transmitting station may transmit a message to all nearby stations, and the receiving stations may calculate a wait time to store the message before retransmitting or relaying the message to a next device. The wait time or buffer time may be based on distance from a destination node, such that a receiving station which is closer to the destination has a shorter wait time (e.g., stores the message for a shorter time in the buffer). When the wait time at one of the stations expires, that station may retransmit the message to other stations to move the message toward the destination node. Once a station retransmits or relays the message, the other receiving stations listen to the retransmission, and the other stations do not retransmit the message. As such, the receiving station closest to the destination node may retransmit the message based on a short wait time, and other stations (e.g., farther from the destination node) may not often retransmit the message based on a longer wait time.

In an example, the UE 115-a may receive a message 205, which the UE 115-a may be configured to relay toward a destination node. The UEs 115 in the wireless communications system may be configured to relay messages according to CBF. For example, the UE 115-a may retransmit the message 205 to each nearby UE 115. For example, the UE 115-a may transmit a message 205-a to the UE 115-b and other nearby UEs 115.

The nearby UEs 115 may receive a retransmission of the message 205 and determine wait times to store the retransmissions. A receiving UE 115 may determine a wait time based on a forward progression of the message at the receiving UE 115. For example, a first wait time at a first receiving UE 115 which is close to the destination may be smaller than a second wait time at a second receiving UE 115 which is farther from the destination. For example, the UE 115-c may be closer to the destination than the UE 115-b, and the retransmission of the message 205 may have a farther progression toward the destination at the UE 115-c than at the UE 115-b. Therefore, for a retransmission of the message 205 transmitted by UE 115-a, the UE 115-c may have a shorter wait time than UE 115-b.

The duration of the wait time may be based on (e.g., scale to) the progression of the message 205 until a theoretical maximum communication range for the wireless access technology. For example, the UE 115-a may be able to transmit a retransmission of the message 205 up to a theoretical maximum distance 210. When the progress of a retransmission of the message 205 reaches the theoretical maximum distance 210 or more, the timer may be calculated to be a minimum timer value 225. For example, any message which is transmitted with a progress which is greater than the theoretical maximum distance 210 may be stored in a buffer at the receiving device for the minimum timer value 225. There may similarly be a maximum timer value 220 for very short relays (e.g., no progression toward the destination or progression in the wrong direction). A retransmission with a progress between zero and the theoretical maximum distance 210 may be calculated to be between the maximum timer value 220 and the minimum timer value 225.

In some cases, an actual maximum communication range 215 may be shorter than the theoretical maximum distance 210. For example, the actual maximum communication range 215 may be affected by different conditions, such as a weather conditions or environmental conditions. In an example, the wireless communications system 200 may be implemented in an urban environment with many obstructions, which may limit the range of wireless signaling. In some cases, the wireless communications system 200 may be implemented with a distance-controlled transmission technology. For example, the wireless communications system 200 may support communications with ranges shorter than the theoretical maximum distance. Additionally, or alternatively, an environment, area, or region with the wireless communications system 200 may impose some distance-based limits for wireless signaling.

If the actual maximum communication range 215 is shorter than the theoretical maximum distance 210, devices outside of the actual maximum communication range 215 may not receive a retransmission of the message 205. For example, UE 115-c may be within the theoretical maximum distance 210 but outside of the actual maximum communication range 215. UE 115-b may be within the actual maximum communication range 215 and may be the closest receiving UE 115 to the destination node.

In some systems, receiving stations may determine the wait times based on the theoretical maximum distance 210, even though the actual maximum communication range 215 is shorter. For example, a station which is at the actual maximum communication range 215 may determine a new minimum timer value 230, even though there are no other devices closer to the destination which can receive and relay the message. For example, the lowest possible timer value may be the minimum timer value 225, but no devices beyond the actual maximum communication range 215 can receive the retransmission of the message, so the new minimum timer value 230 may be much higher. For a device at the actual maximum communication range 215, there may be a time waste 235 between the minimum timer value 225 and the new minimum timer value 230, or the calculated wait time at the actual maximum communication range 215 in these systems. The time waste 235 may increase delay at each hop or relay between stations toward the destination.

The wireless communications system 200 may utilize techniques to use a dynamically indicated maximum communication range for message relaying, such as CBF. For example, the wireless communications system 200 may provide techniques for a UE 115 to use the actual maximum communication range 215 instead of the theoretical maximum communication range 210. For example, a UE 115 may receive a message to relay, and the UE 115 may use the actual maximum communication range 215 instead of the theoretical maximum distance 210 to determine a wait time when buffering the message. This may reduce a wait time for relaying stations within the actual maximum communication range 215. For example, at the actual maximum communication range 215, a UE 115 may use the minimum timer value 225 (e.g., instead of the new minimum timer value 230).

To support these techniques, UEs 115 may dynamically indicate a maximum communication range (e.g., the actual maximum communication range 215) with the message 205 to the next stations. Then, each receiving UE 115 may determine a wait time based on the dynamically indicated maximum communication range. By indicating the dynamic maximum distance, each transmitting UE 115 and receiving UE 115 may consistently use the same actual maximum distance when determining wait times for retransmitting a message according to CBF.

For example, the UE 115-a may transmit the message 205-a to the UE 115-b, and the UE 115-a may include an indication of the actual maximum communication range 215 with the message 205-a. The UE 115-b may determine a wait time to store the message 205-a based on setting the maximum distance to the actual maximum communication range 215 instead of the theoretical maximum distance 210. For example, the UE 115-b may determine a minimum timer value (e.g., TO_CBF MIN) and a maximum timer value (e.g., TO_CBF_MAX) based on the dynamically indicated maximum distance (e.g., a dynamically indicated value for DIST_MAX). This may lead to a shorter wait time for the UE 115-b to store the message before retransmitting and further reducing wait times in each hop when the communication range is limited.

In some cases, the indicate of the actual maximum communication range 215 may be indicated in a header of a message 205. For example, the message 205-a may include a header indicating the actual maximum communication range 215 as the dynamically indicated maximum distance. In some cases, the dynamic maximum distance may be indicated in a basic header, an extended header, a common header, a group header, or any combination thereof. In some examples, the header may be an example of a GeoNetworking header. In some cases, a transmitting UE 115 may use different types or sized headers to dynamically indicate the maximum distance. In some examples, different headers may be configured with different fields or field lengths, which may provide different granularity or distance ranges. For example, a four bit field in a header may indicate a maximum distance between 60 meters and 960 meters, or an eight bit field in a header may indicate a maximum distance between 5 meters and 1280 meters, among other examples or configurations.

The UE 115-b may receive the message 205-a from the UE 115-a and identify the indicated maximum distance from the message 205-a. The UE 115-b may determine a timer value based on a progress of the message 205-a (e.g., a progress of the message from UE 115-a to the UE 115-b toward a destination) and the indicated maximum distance. The UE 115-b may store the message in a buffer for the determined timer value and, when the timer value expires, retransmit the message 205 to other stations. For example, the UE 115-b may transmit a message 205-b (e.g., a retransmission of the message 205) to the UE 115-d, and the message 205-b may include an indication of the actual maximum communication range 215 as the maximum distance. Stations which received a retransmission of the message 205 from the UE 115-a may receive the retransmission of the message 205 from the UE 115-b, and these stations may refrain from retransmitting.

In some cases, the wireless communications system may support techniques for distance-based connectionless groupcast signaling for CBF. For example, UE 115-a may transmit messages 205 to nearby stations as distance-based connectionless groupcast transmissions. Distance-based connection groupcast may provide reliable packet transmission via HARQ functionality for receiving UEs 115 within a certain range (e.g., within a QoS range). The wireless communications system may utilize distance-based connectionless groupcast signaling for CBF techniques to increase transmission reliability.

Distance-based connectional groupcast signaling for CBF may be utilized with the techniques for dynamically indicating an actual communication range for CBF. In a first example, transmission progress may not be limited to the QoS range. For example, the QoS range may not further limit the actual maximum communication range 215, and the maximum distance may be set to the QoS range or the actual maximum communication range 215. With the maximum distance set to the actual maximum communication range 215, message progress may not be limited to the QoS range, and waiting time may be the same, but transmission reliability may be increased within the QoS range due to the HARQ functionality. In some cases, the QoS range may be set to the maximum distance. In this example, message progress may not be strictly limited to the QoS range, but the receiving stations outside of the QoS range may not have a priority to forward the message. In this example, the wait time may be optimized for receivers within the QoS range to provide HARQ functionality while providing a possibility to relay a message farther.

In a second example, receiving stations within the QoS range may be candidate forwarding devices. Receiving stations outside of the QoS range may not relay CBF messages. In this example, message progress may be limited to the QoS range, waiting time may be optimized within the QoS range, and any CBF message may have HARQ functionality.

These techniques may provide lower latency for message relaying techniques such as CBF. Additionally, some techniques may provide higher reliability by implementing HARQ functionality by using broadcast or groupcast signaling, such as distance-based connectionless groupcast signaling.

Figure 3:
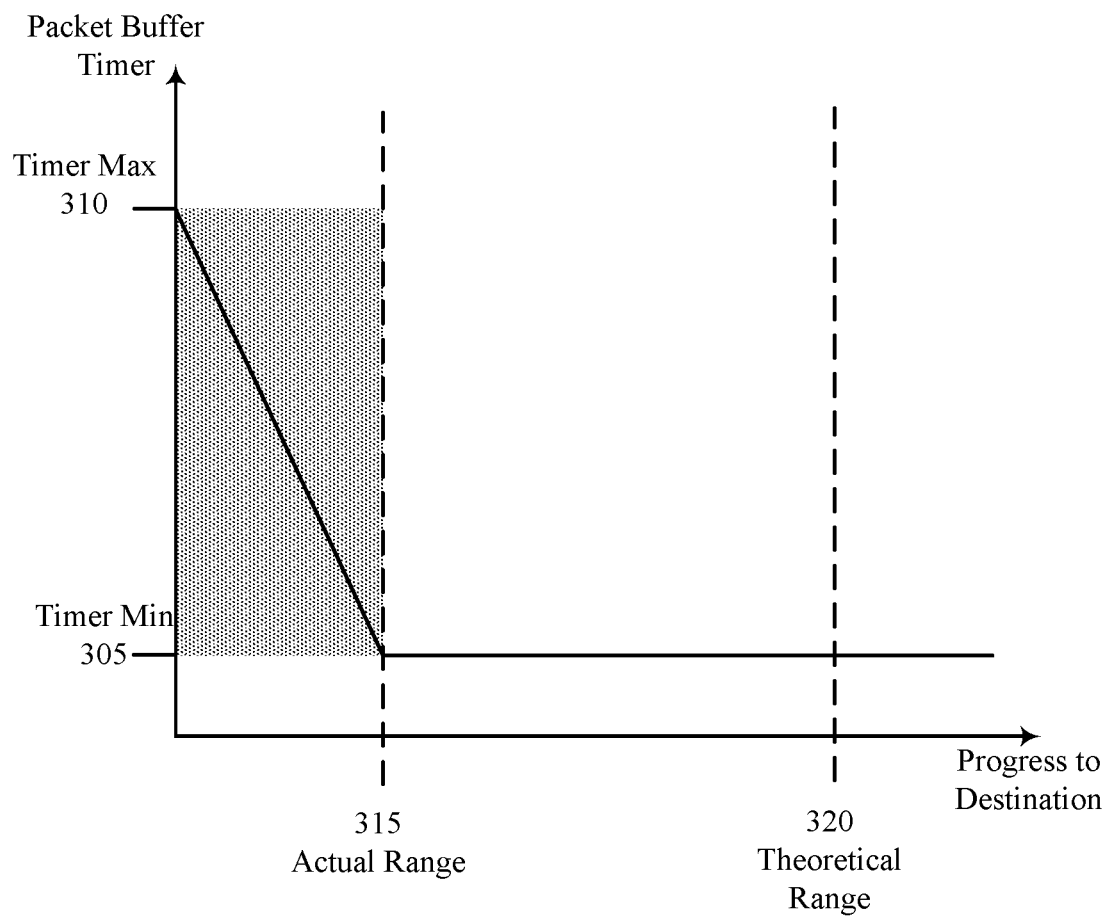
FIG. 3 illustrates an example of a dynamic range configuration that supports techniques for dynamic distance control for CBF in accordance with aspects of the present disclosure.

FIG. 3 illustrates an example of a dynamic range configuration 300 that supports techniques for dynamic distance control for CBF in accordance with aspects of the present disclosure.

A UE 115, or a station, may be configured for message relaying techniques such as CBF. When the UE 115 receives the message, the UE 115 may determine a timer value between a minimum timer value 305 and a maximum timer value 310 based on a change in proximity to a destination or based on a progression of the message toward the destination. For example, if the receiving UE 115 is closer to the destination, the UE 115 may store the message in a buffer for a shorter amount of time than if the UE 115 were farther from the destination. The minimum timer value 305 may correspond to a maximum distance (e.g., a maximum message progression), and the maximum timer value 310 may correspond to a minimum distance (e.g., a minimum message progression).

By implementing techniques described herein, a UE 115 may be configured to use a dynamic maximum distance instead of a theoretical maximum distance to determine a timer value. For example, the UE 115 may receive a configuration including an indication of a dynamic maximum range. The dynamic maximum range may, in some cases, correspond to an actual maximum communication range 315 for relaying a CBF message. The actual maximum communication range 315 may be shorter than a theoretical maximum communication range 320 due to various conditions, such as weather conditions, environmental conditions, technology restrictions, or the like.

At the actual maximum communication range 315, relaying stations may use the minimum timer value 305. This may reduce a wait time for devices within the actual maximum communication range 315. For example, the wait time may scale to the actual maximum communication range 315 instead of the theoretical maximum communication range 320. Devices outside of the actual maximum communication range 315 may be unable to receive the message and therefore unable to relay the message. Therefore, devices at the actual maximum communication range 315 may use the shortest possible timer value (e.g., instead of a longer timer value if the wait time were based on the theoretical maximum communication range 320).

In some cases, the UE 115 may receive an indication of the maximum distance from a CBF message or in a CBF configuration received from a base station 105 or roadside unit. In some examples, the UE 115 may determine the maximum distance based on geographical information or positioning information of the UE 115. For example, within certain areas or regions, the UE 115 may be restricted to a certain maximum communication range.

When the UE 115 relays the message, the UE 115 may include an indication of the maximum distance with the message. For example, the UE 115 may include an indication that the maximum distance for CBF corresponds to the actual maximum communication range (e.g., instead of the theoretical maximum communication range). In some cases, the UE 115 may include the indication in a header of the message, such as in a field of the header of the message. The header may be an example of a basic header, an extended header, a common header, or a group-based header, or any combination thereof. In some cases, the UE 115 may select a format or type of header to indicate the maximum distance. For example, the UE 115 may use a header with sufficient bits to indicate a certain granularity or range.

Figure 4:
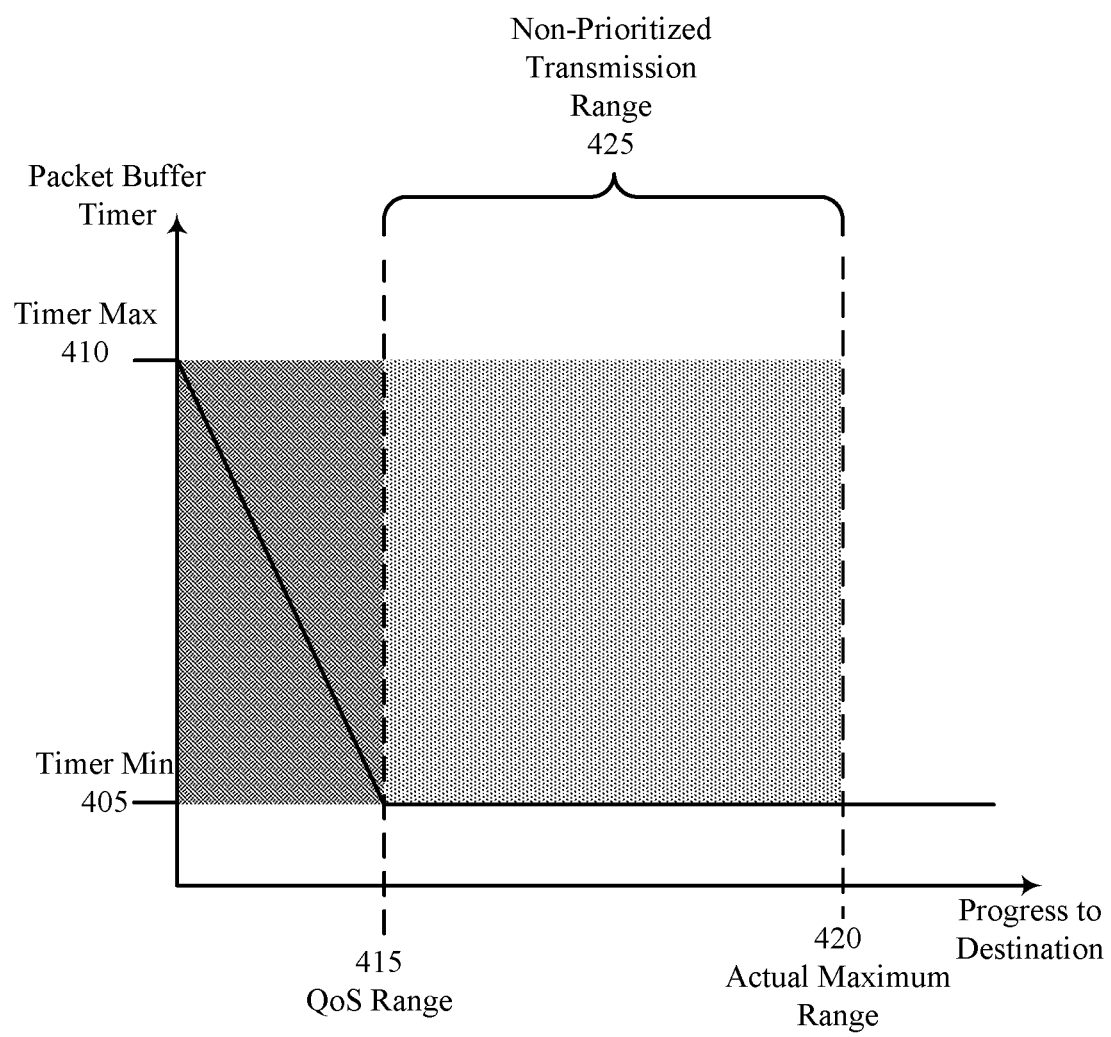
FIG. 4 illustrates an example of a quality of service (QoS)-based dynamic range configuration that supports techniques for dynamic distance control for CBF in accordance with aspects of the present disclosure.

FIG. 4 illustrates an example of a QoS-based dynamic range configuration 400 that supports techniques for dynamic distance control for CBF in accordance with aspects of the present disclosure.

A UE 115, or a station, may be configured for message relaying techniques such as CBF. When the UE 115 receives the message, the UE 115 may determine a timer value between a minimum timer value 405 and a maximum timer value 410 based on a change in proximity to a destination or based on a progression of the message toward the destination. For example, if the receiving UE 115 is closer to the destination, the UE 115 may store the message in a buffer for a shorter amount of time than if the UE 115 were farther from the destination. The minimum timer value 405 may correspond to a maximum distance (e.g., a maximum message progression), and the maximum timer value 410 may correspond to a minimum distance (e.g., a minimum message progression).

The UE 115 may be configured to use a dynamic maximum distance instead of a theoretical maximum distance to determine a timer value. In some cases, the dynamic maximum distance may be based on a QoS region of the message. For example, the message may be transmitted using broadcast or groupcast signaling, such as distance-based connectionless groupcast signaling. Distance-based connectionless groupcast signaling may provide reliable packet transmission via HARQ functionality for receiving UEs 115 within a certain range (e.g., within a QoS range 415), which may increase transmission reliability.

For example, the UE 115 may receive a receive a message to relay and an indication of a dynamic maximum range. The dynamic maximum range may, in some cases, correspond to an actual maximum communication range for relaying a CBF message, a QoS range 415 of the message, or the theoretical maximum distance. The actual maximum communication range 420 may be shorter than a theoretical maximum communication range due to various conditions, such as weather conditions, environmental conditions, technology restrictions, or the like.

In some cases, the dynamic maximum range may be set to the QoS range 415. In this example, wait times may be optimized for UEs 115 within the QoS range 415. In some cases, message progress may not be limited to the QoS range, but the receiving stations outside of the QoS range 415 may not have a priority to forward the message. For example, stations within a non-prioritized transmission range 425 may still be able to receive the message, but stations in this range may not be prioritized (e.g., with lower wait times) or provide HARQ functionality due to being outside of the QoS range 415. In this example, the wait time may be optimized for receivers within the QoS range 415 to provide HARQ functionality while providing a possibility to relay a message farther (e.g., farther than the QoS range 415, up to the actual maximum communication range 420).

In some examples, the dynamic maximum range may be set to the actual maximum communication range 420. For example, the QoS range 415 may not further limit the communication range if the QoS range 415 is shorter than the actual maximum communication range 420. In this example, the wait time may not be optimized for UEs 115 within the QoS range 415, but devices within the QoS range 415 may provide HARQ functionality. For example, with the dynamic maximum range set to the actual maximum communication range 420, message progress may not be limited to the QoS range 415, and waiting time may not be improved for devices within the QoS range 415, but transmission reliability may be increased within the QoS range 415 due to the HARQ functionality. In some cases, the dynamic maximum range may be set to the theoretical maximum communication range, which may provide HARQ functionality for UEs 115 within the QoS range 415.

In some examples, receiving stations within the QoS range 415 may be candidate forwarding devices. Receiving stations outside of the QoS range 415 may not relay CBF messages. In this example, message progress may be limited to the QoS range 415, waiting time may be optimized within the QoS range, and CBF messages may have HARQ functionality. For example, UEs 115 within the non-prioritized transmission range 425 may be unable to forward the message in this example.

When the UE 115 relays the message, the UE 115 may include an indication of the dynamic maximum range with the message. In some cases, the dynamic maximum range may be indicated based on a QoS profile or configuration of the message. Additionally, or alternatively, the UE 115 may include the indication of the dynamic maximum range in a header of the message, such as in a field of the header of the message.

Figure 5:
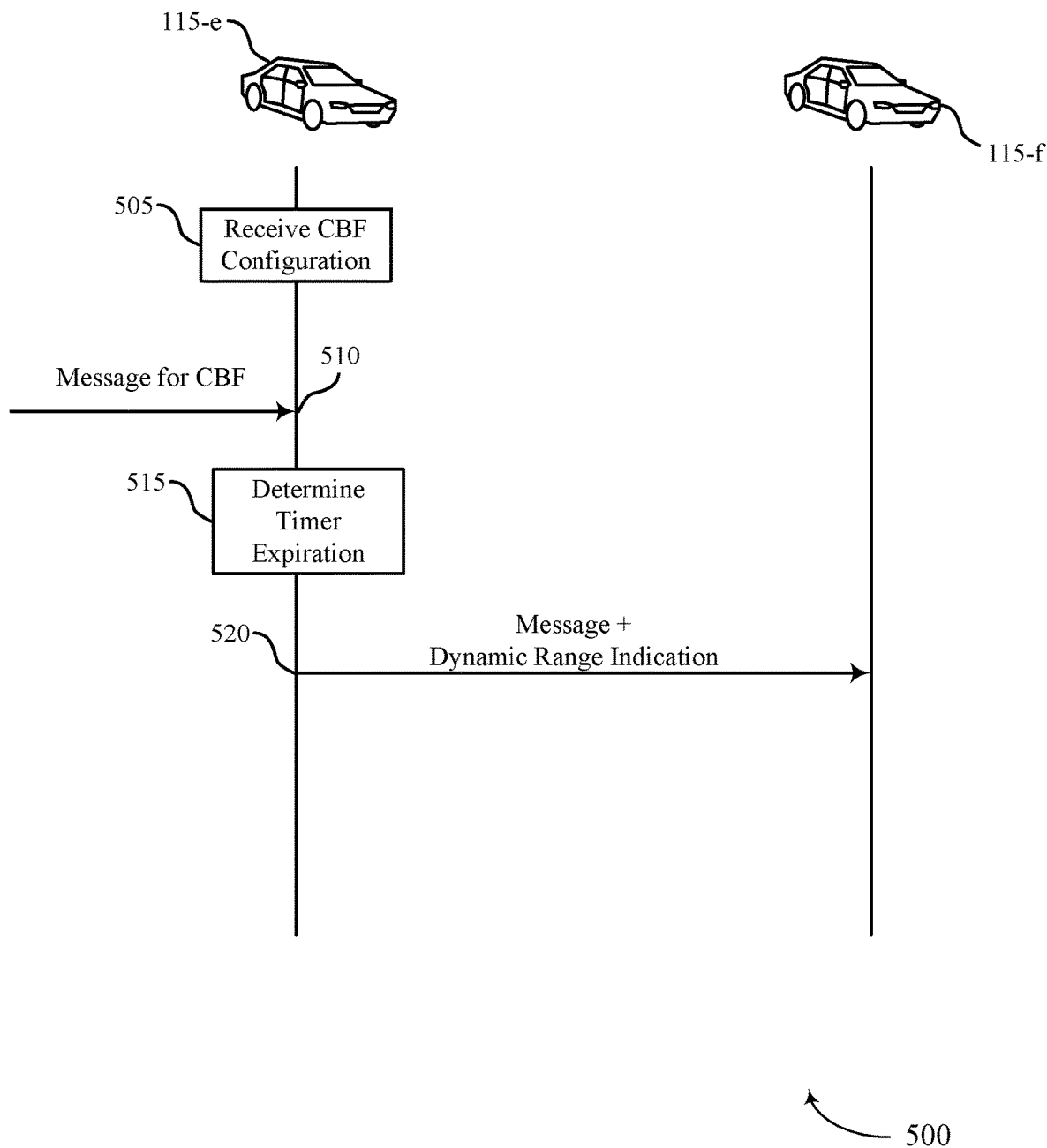
FIG. 5 illustrates an example of a process flow that supports techniques for dynamic distance control for CBF in accordance with aspects of the present disclosure.

FIG. 5 illustrates an example of a process flow 500 that supports techniques for dynamic distance control for CBF in accordance with aspects of the present disclosure. The process flow 500 may be implemented by a UE 115-e or a UE 115-f, or both, which may each be an example of a UE 115 as described herein. UE 115-e and UE 115-e may be examples of vehicular UEs 115, mobile devices, TRPs, RSUs, or any combination thereof. In some examples, UE 115-e and UE 115-f may be configured for V2X communications, such as distance-based connectionless groupcast signaling.

At 505, UE 115-e may receive signaling indicating a configuration for CBF associated with a maximum communication range for CBF signaling. For example, the configuration for CBF may include an indication of a theoretical maximum communication range for CBF signaling. The signaling indicating the configuration may be received from a base station 105, another UE 115, an RSU, or any combination thereof.

At 510, UE 115-e may receive a message configured for CBF. The message may include a first indication of a dynamic communication range for the CBF, where the dynamic communication range is less than or equal to the maximum communication range. In some cases, the UE 115-e may receive the message from another UE 115. In some examples, the message received at 510 may include a header indicating the dynamic communication range. In some cases, the dynamic communication range may be based on a QoS range corresponding to a QoS profile of the message. Additionally, or alternatively, the dynamic communication range may be based on an actual communication range of the wireless communications system. For example, the actual maximum communication range may be shorter than the theoretical maximum communication range, such as due to weather, obstructions, wireless communication configurations, etc.

UE 115-e may determine a timer value to relay the message based on a progress of the message toward the destination. In some cases, UE 115-e may determine the timer value based on the indicated dynamic communication range. For example, UE 115-e may determine a minimum timer value based on the indicated dynamic communication range and a maximum timer value based on the CBF configuration. UE 115-e may determine the timer value based on how much progress (e.g., distance) was made to send the message toward the destination. UE 115-e may store the message in a buffer for the determined timer value.

When the timer value expires, the UE 115-e may retransmit the message to nearby stations, including at least UE 115-f Other UEs 115 with timers which have not expired may refrain from retransmitting the message based on receiving the retransmitted message from the UE 115-e.

For example, at 520, the UE 115-e may transmit the message to one or more neighboring stations based on the timer associated with the dynamic communication range. The message (e.g., transmitted at 520) may include a second indication of the dynamic communication range. By indicating the dynamic communication range with the message, the UE 115-e may inform the receiving stations to use the dynamic communication range when determining timer values for CBF.

In some cases, UE 115-e may receive and transmit messages according to broadcast or groupcast signaling. For example, UE 115-e may transmit the message at 520 using distance-based connectionless groupcast signaling. The distance-based connectionless groupcast signaling may provide HARQ functionality within a QoS range. For example, UE 115-e may receive HARQ feedback for relayed messages within the QoS range, and UE 115-e may attempt retransmission for any unsuccessfully received messages.

Figure 6:
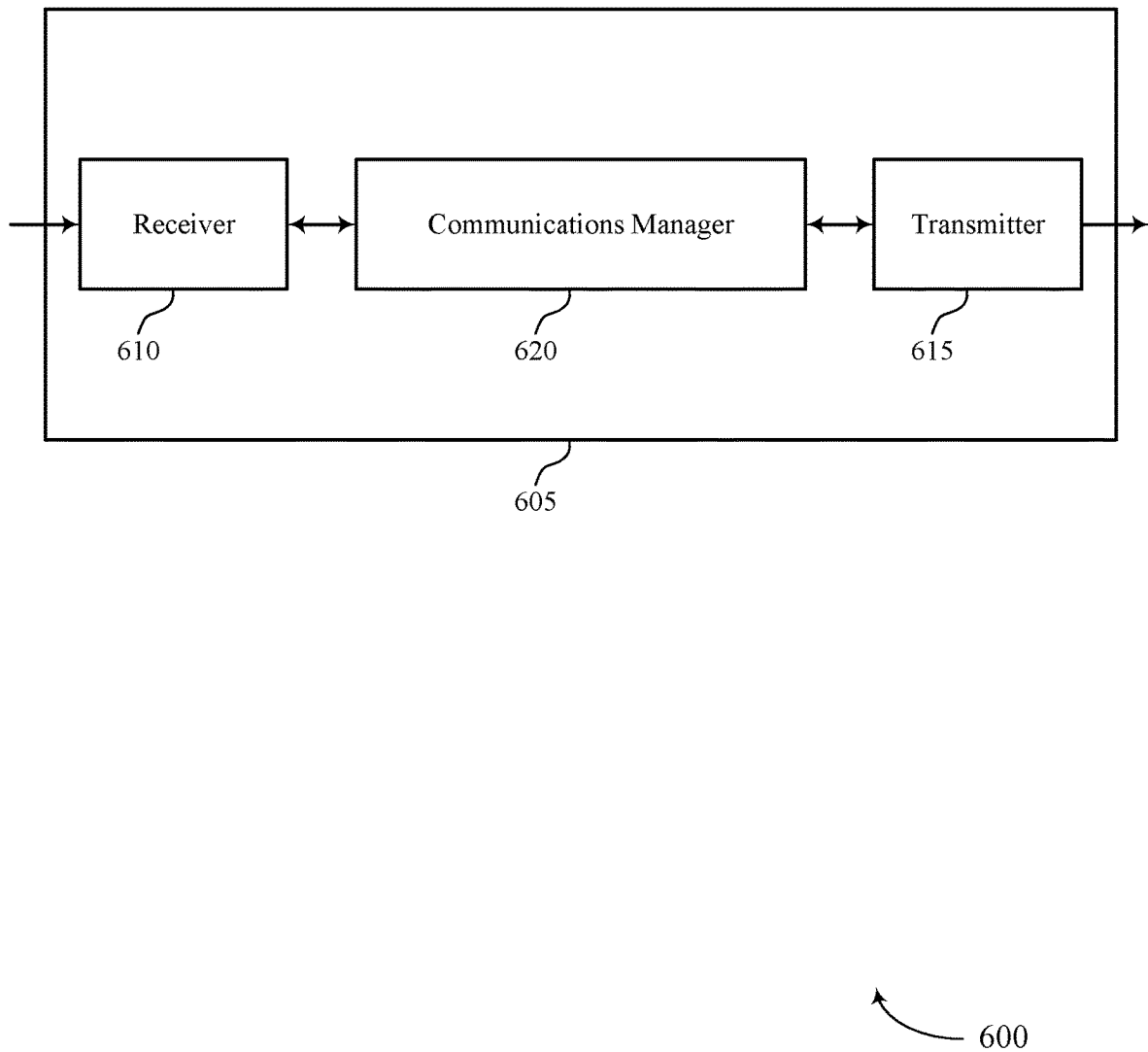
FIGS. 6 and 7 show block diagrams of devices that support techniques for dynamic distance control for CBF in accordance with aspects of the present disclosure.

FIG. 6 shows a block diagram 600 of a device 605 that supports techniques for dynamic distance control for CBF in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for dynamic distance control for CBF). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for dynamic distance control for CBF). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for dynamic distance control for CBF as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving signaling indicating a configuration for CBF associated with a maximum communication range for CBF signaling. The communications manager 620 may be configured as or otherwise support a means for receiving a message configured for the CBF, the message including a first indication of a dynamic communication range for the CBF, where the dynamic communication range is less than or equal to the maximum communication range. The communications manager 620 may be configured as or otherwise support a means for transmitting the message to one or more neighboring stations based on a timer associated with the dynamic communication range, where the message includes a second indication of the dynamic communication range.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing latency for message relaying, such as message relaying using CBF. By determining a minimum timer value for a received message according to a dynamically indicated communication range, the device 605 may reduce have a lower wait time to retransmit the message. Some techniques described herein provide higher reliability for message relaying techniques, such as by implementing V2X communications with HARQ functionality. For example, the device 605 may communicate (e.g., transmit and receive) messages for CBF using distance-based groupcast signaling. Receiving devices within a QoS range may have HARQ functionality for the relayed messages transmitted using distance-based groupcast signaling, improving message reliability.

Figure 7:
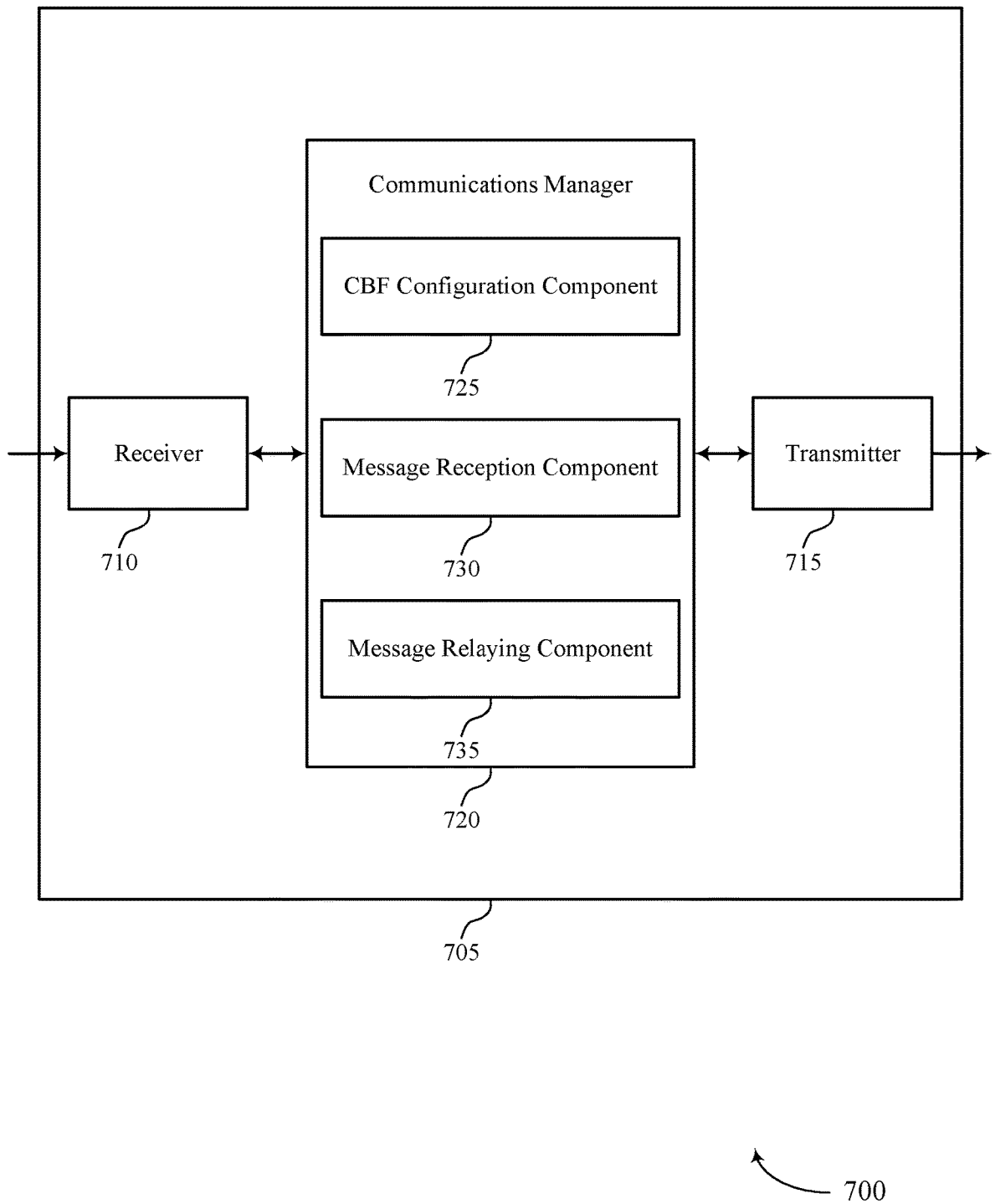

FIG. 7 shows a block diagram 700 of a device 705 that supports techniques for dynamic distance control for CBF in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for dynamic distance control for CBF). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for dynamic distance control for CBF). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for dynamic distance control for CBF as described herein. For example, the communications manager 720 may include a CBF configuration component 725, a message reception component 730, a message relaying component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The CBF configuration component 725 may be configured as or otherwise support a means for receiving signaling indicating a configuration for CBF associated with a maximum communication range for CBF signaling. The message reception component 730 may be configured as or otherwise support a means for receiving a message configured for the CBF, the message including a first indication of a dynamic communication range for the CBF, where the dynamic communication range is less than or equal to the maximum communication range. The message relaying component 735 may be configured as or otherwise support a means for transmitting the message to one or more neighboring stations based on a timer associated with the dynamic communication range, where the message includes a second indication of the dynamic communication range.

Figure 8:
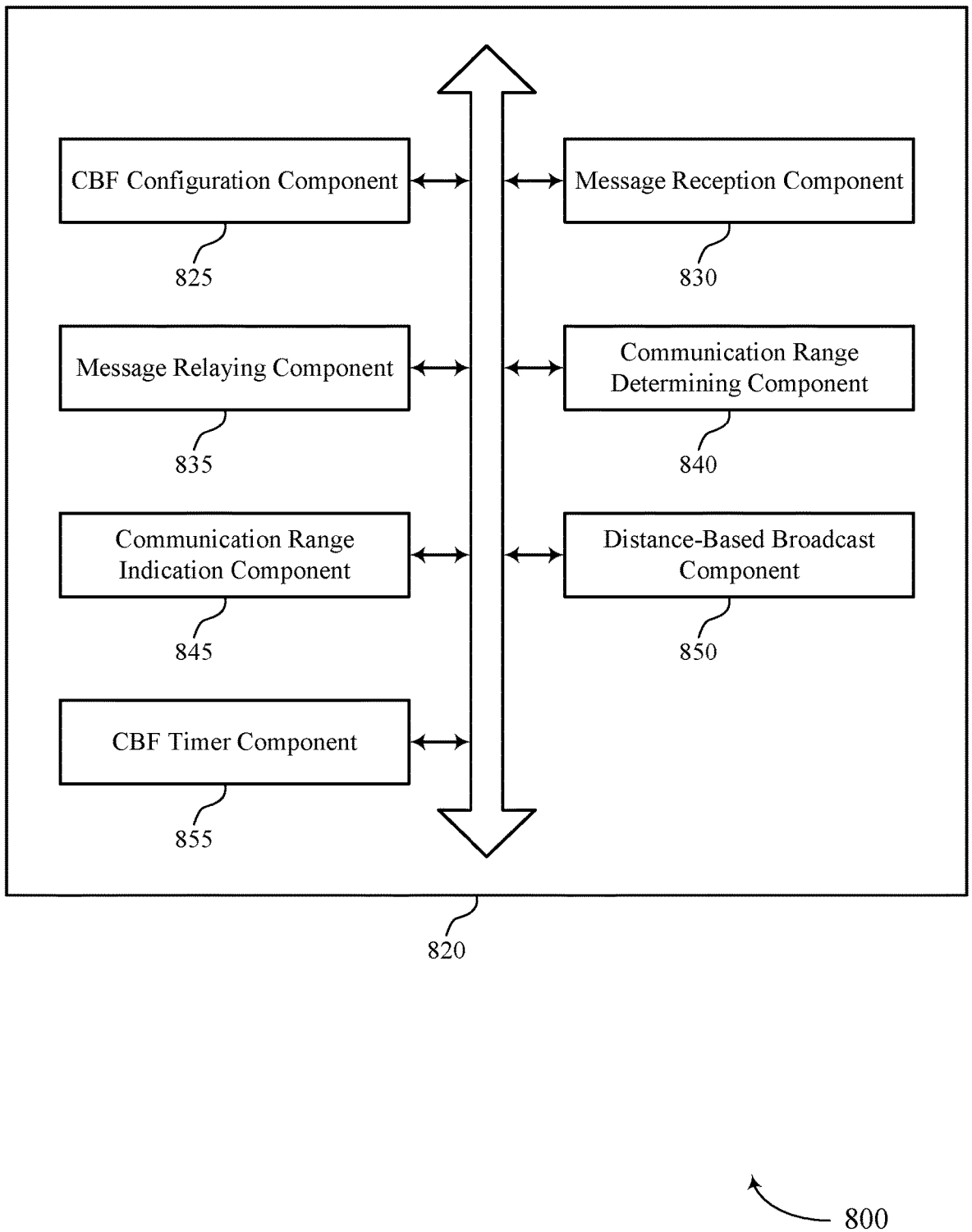
FIG. 8 shows a block diagram of a communications manager that supports techniques for dynamic distance control for CBF in accordance with aspects of the present disclosure.

FIG. 8 shows a block diagram 800 of a communications manager 820 that supports techniques for dynamic distance control for CBF in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for dynamic distance control for CBF as described herein. For example, the communications manager 820 may include a CBF configuration component 825, a message reception component 830, a message relaying component 835, a communication range determining component 840, a communication range indication component 845, a distance-based broadcast component 850, a CBF timer component 855, or any combination thereof. Each of these components may communicate, directly or indirectly, with one another (e.g., via one or more buses).

The communications manager 820 may support wireless communications at a UE in accordance with examples as disclosed herein. The CBF configuration component 825 may be configured as or otherwise support a means for receiving signaling indicating a configuration for CBF associated with a maximum communication range for CBF signaling. The message reception component 830 may be configured as or otherwise support a means for receiving a message configured for the CBF, the message including a first indication of a dynamic communication range for the CBF, where the dynamic communication range is less than or equal to the maximum communication range. The message relaying component 835 may be configured as or otherwise support a means for transmitting the message to one or more neighboring stations based on a timer associated with the dynamic communication range, where the message includes a second indication of the dynamic communication range.

In some examples, the communication range determining component 840 may be configured as or otherwise support a means for determining the dynamic communication range based on a QoS range corresponding to a QoS profile of the message.

In some examples, to support transmitting the message, the communication range indication component 845 may be configured as or otherwise support a means for transmitting the message with a message header including the second indication of the dynamic communication range.

In some examples, to support transmitting the message, the distance-based broadcast component 850 may be configured as or otherwise support a means for transmitting a distance-based broadcast transmission including the message to the one or more neighboring stations.

In some examples, to support transmitting the message, the CBF timer component 855 may be configured as or otherwise support a means for determining the timer associated with the dynamic communication range has expired. In some examples, to support transmitting the message, the CBF timer component 855 may be configured as or otherwise support a means for transmitting the message to the one or more neighboring stations based on expiration of the timer.

In some examples, the CBF timer component 855 may be configured as or otherwise support a means for determining a minimum delay timer based on the dynamic communication range for the CBF, where the minimum delay timer is the timer.

In some examples, to support transmitting the message, the message relaying component 835 may be configured as or otherwise support a means for transmitting the message including the second indication of the dynamic communication range and an indication of the maximum communication range, where the timer is determined according to the dynamic communication range, and a range for the message corresponds to the maximum communication range.

In some examples, the communication range determining component 840 may be configured as or otherwise support a means for determining the dynamic communication range for the CBF based on a network-configured transmission distance configuration.

In some examples, the maximum communication range is a theoretical maximum communication range for the CBF.

In some examples, to support transmitting the message to the one or more neighboring stations, the message relaying component 835 may be configured as or otherwise support a means for transmitting a V2X message to one or more neighboring V2X UEs, where the UE is a V2X UE.

Figure 9:
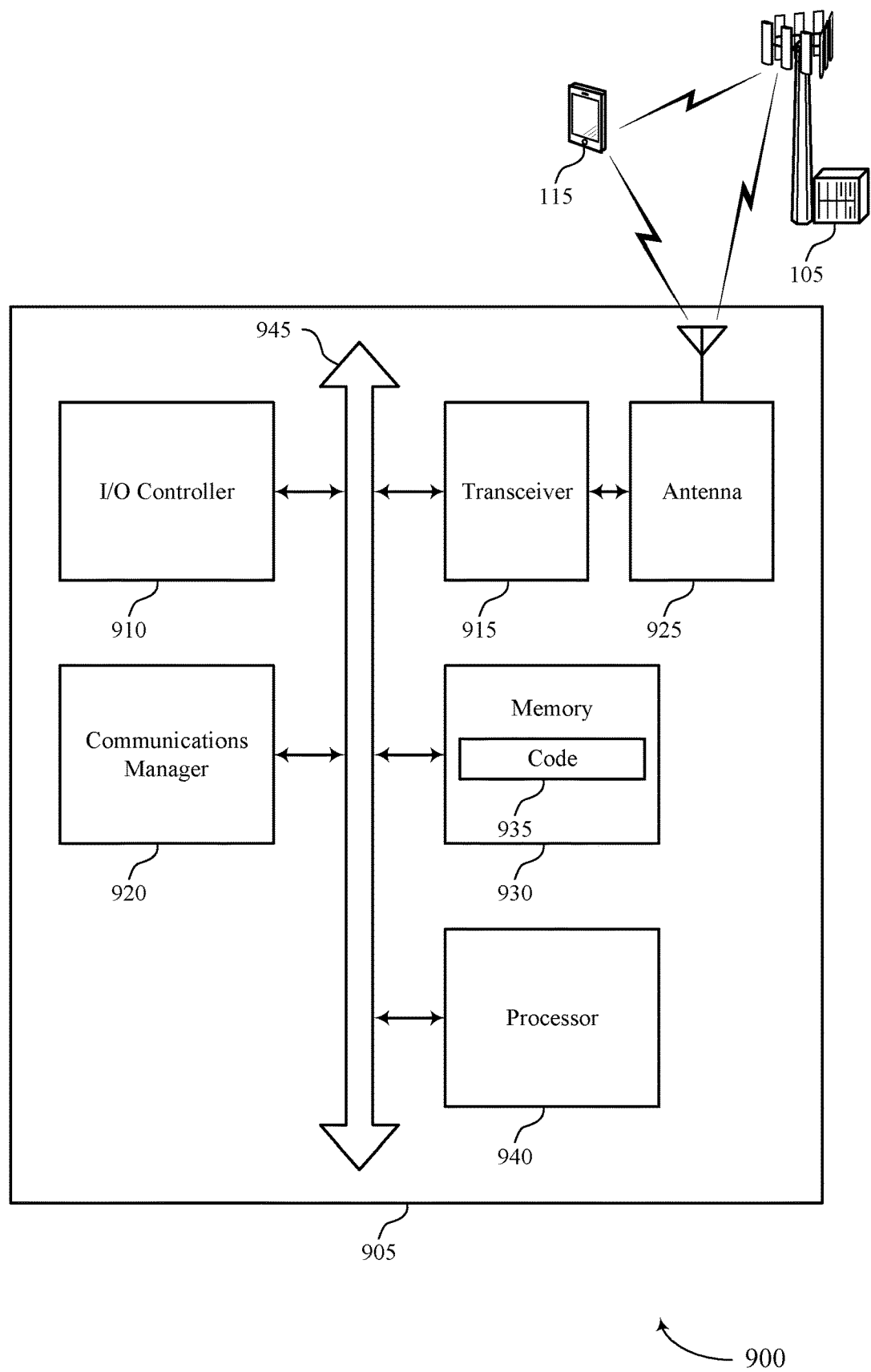
FIG. 9 shows a diagram of a system including a device that supports techniques for dynamic distance control for CBF in accordance with aspects of the present disclosure.

FIG. 9 shows a diagram of a system 900 including a device 905 that supports techniques for dynamic distance control for CBF in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for dynamic distance control for CBF). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving signaling indicating a configuration for CBF associated with a maximum communication range for CBF signaling. The communications manager 920 may be configured as or otherwise support a means for receiving a message configured for the CBF, the message including a first indication of a dynamic communication range for the CBF, where the dynamic communication range is less than or equal to the maximum communication range. The communications manager 920 may be configured as or otherwise support a means for transmitting the message to one or more neighboring stations based on a timer associated with the dynamic communication range, where the message includes a second indication of the dynamic communication range.

By including or configuring the communications manager 920 in accordance with examples as described herein, the device 905 may support techniques for reducing latency for message relaying, such as message relaying using CBF. By determining a minimum timer value for a received message according to a dynamically indicated communication range, the device 905 may reduce have a lower wait time to retransmit the message. Some techniques described herein provide higher reliability for message relaying techniques, such as by implementing V2X communications with HARQ functionality. For example, the device 905 may communicate (e.g., transmit and receive) messages for CBF using distance-based groupcast signaling. Receiving devices within a QoS range may have HARQ functionality for the relayed messages transmitted using distance-based groupcast signaling, improving message reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for dynamic distance control for CBF as described herein, or the processor 940 and the memory 930 may be otherwise configured to perform or support such operations.

Figure 10:
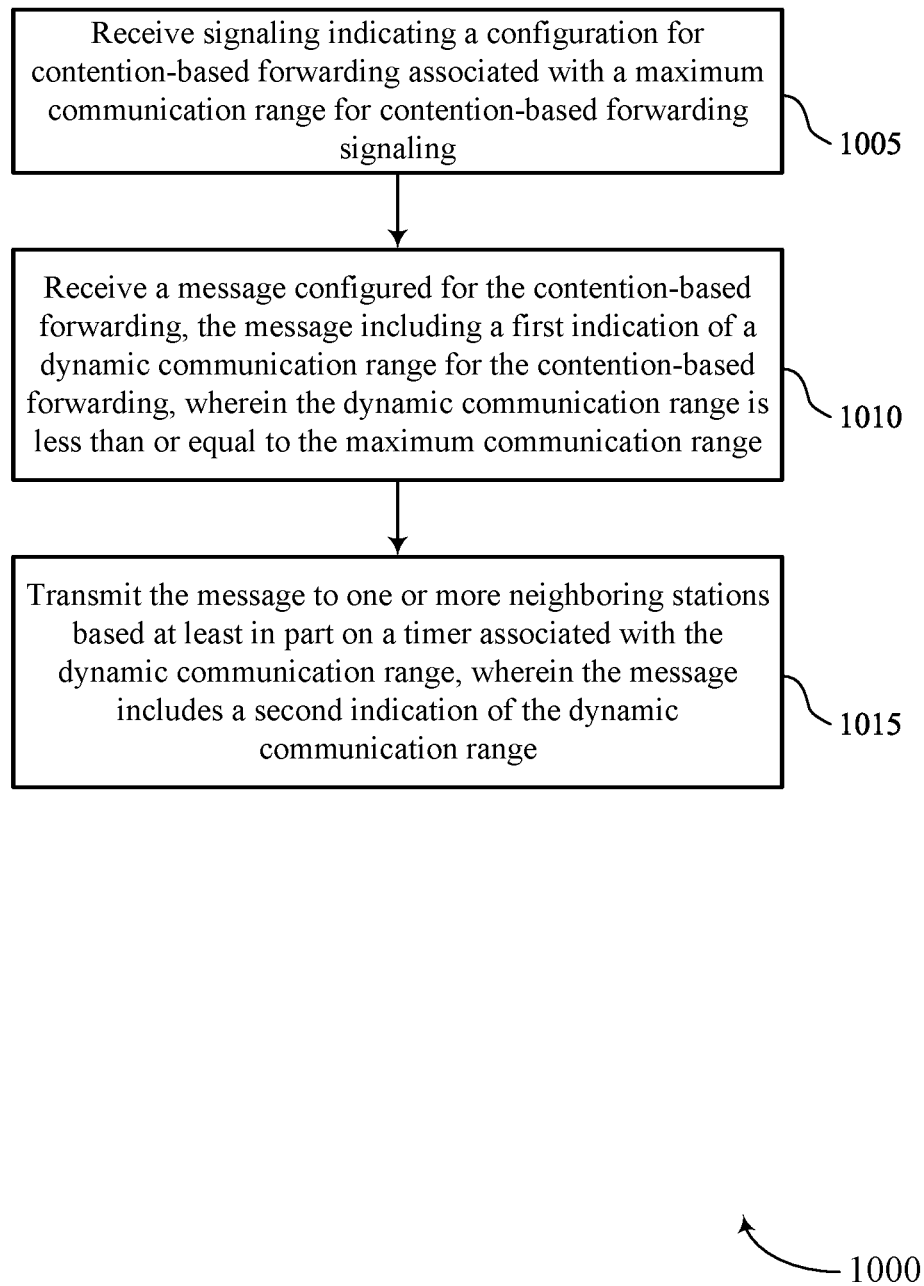
FIGS. 10 through 12 show flowcharts illustrating methods that support techniques for dynamic distance control for CBF in accordance with aspects of the present disclosure.

FIG. 10 shows a flowchart illustrating a method 1000 that supports techniques for dynamic distance control for CBF in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving signaling indicating a configuration for CBF associated with a maximum communication range for CBF signaling. The operations of 1005 may be performed in accordance with examples as disclosed herein. In some examples, aspects of the operations of 1005 may be performed by a CBF configuration component 825 as described with reference to FIG. 8.

At 1010, the method may include receiving a message configured for the CBF, the message including a first indication of a dynamic communication range for the CBF, where the dynamic communication range is less than or equal to the maximum communication range. The operations of 1010 may be performed in accordance with examples as disclosed herein. In some examples, aspects of the operations of 1010 may be performed by a message reception component 830 as described with reference to FIG. 8.

At 1015, the method may include transmitting the message to one or more neighboring stations based on a timer associated with the dynamic communication range, where the message includes a second indication of the dynamic communication range. The operations of 1015 may be performed in accordance with examples as disclosed herein. In some examples, aspects of the operations of 1015 may be performed by a message relaying component 835 as described with reference to FIG. 8.

Figure 11:
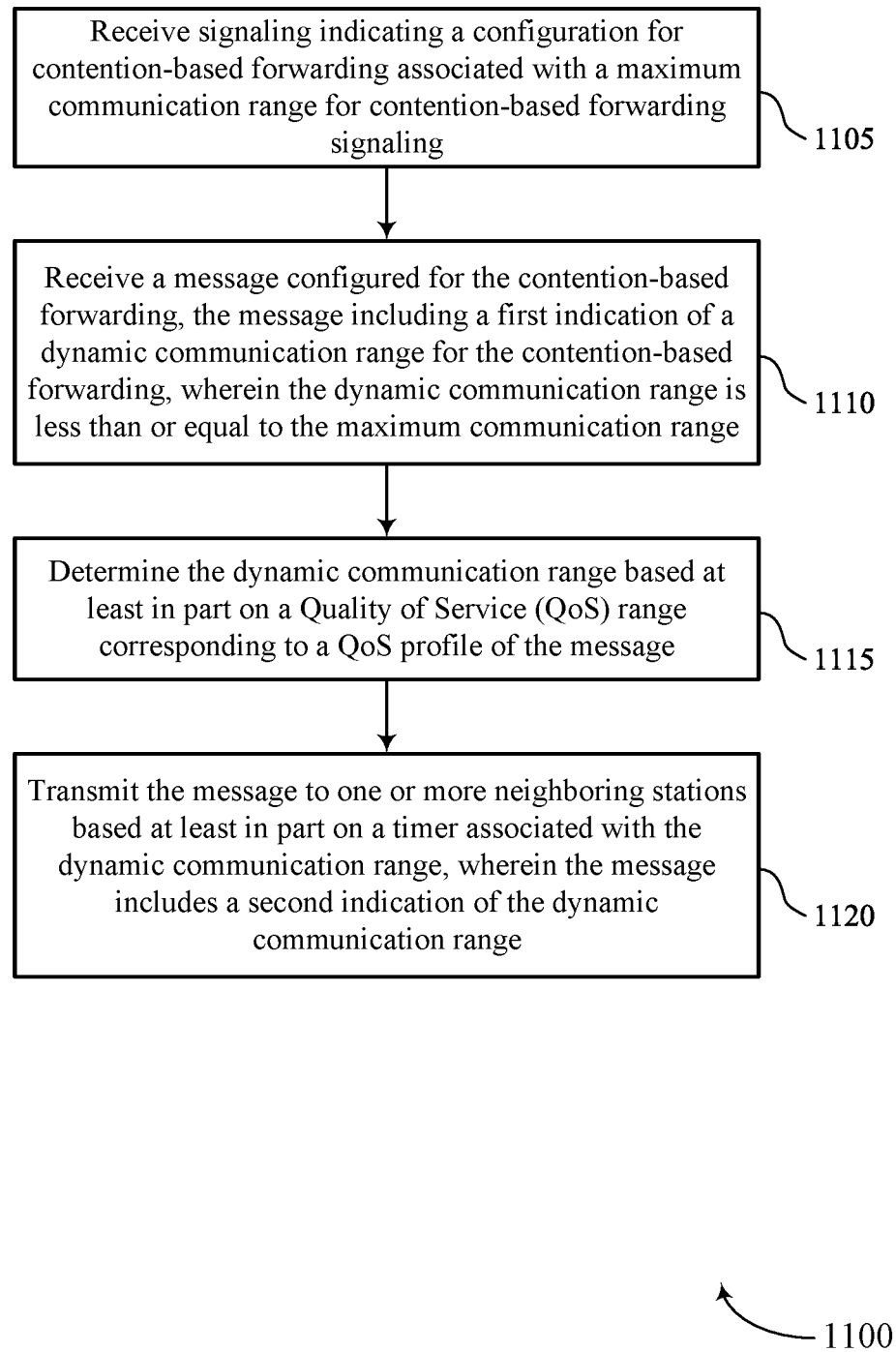

FIG. 11 shows a flowchart illustrating a method 1100 that supports techniques for dynamic distance control for CBF in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving signaling indicating a configuration for CBF associated with a maximum communication range for CBF signaling. The operations of 1105 may be performed in accordance with examples as disclosed herein. In some examples, aspects of the operations of 1105 may be performed by a CBF configuration component 825 as described with reference to FIG. 8.

At 1110, the method may include receiving a message configured for the CBF, the message including a first indication of a dynamic communication range for the CBF, where the dynamic communication range is less than or equal to the maximum communication range. The operations of 1110 may be performed in accordance with examples as disclosed herein. In some examples, aspects of the operations of 1110 may be performed by a message reception component 830 as described with reference to FIG. 8.

At 1115, the method may include determining the dynamic communication range based on a QoS range corresponding to a QoS profile of the message. The operations of 1115 may be performed in accordance with examples as disclosed herein. In some examples, aspects of the operations of 1115 may be performed by a communication range determining component 840 as described with reference to FIG. 8.

At 1120, the method may include transmitting the message to one or more neighboring stations based on a timer associated with the dynamic communication range, where the message includes a second indication of the dynamic communication range. The operations of 1120 may be performed in accordance with examples as disclosed herein. In some examples, aspects of the operations of 1120 may be performed by a message relaying component 835 as described with reference to FIG. 8.

Figure 12:
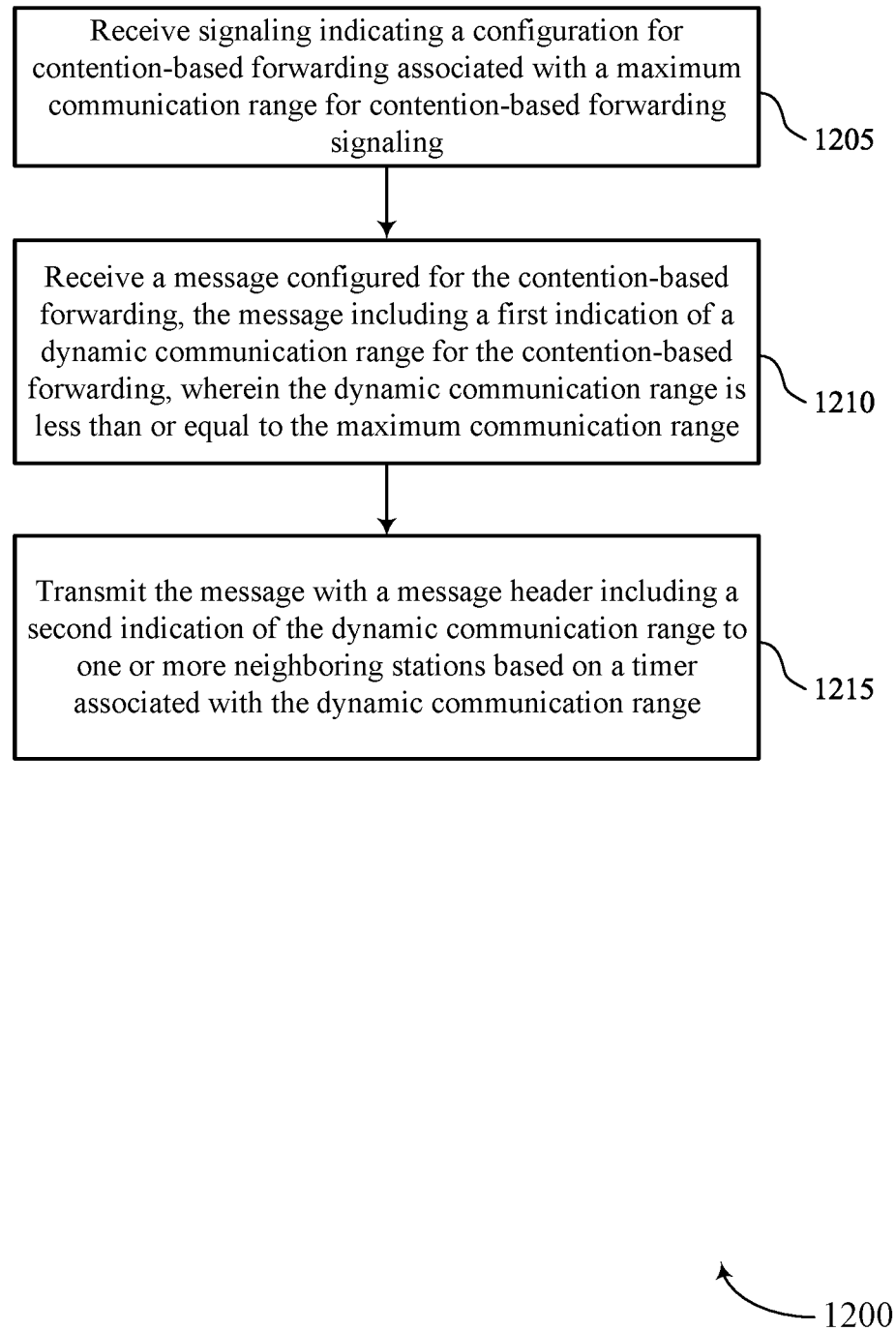

FIG. 12 shows a flowchart illustrating a method 1200 that supports techniques for dynamic distance control for CBF in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving signaling indicating a configuration for CBF associated with a maximum communication range for CBF signaling. The operations of 1205 may be performed in accordance with examples as disclosed herein. In some examples, aspects of the operations of 1205 may be performed by a CBF configuration component 825 as described with reference to FIG. 8.

At 1210, the method may include receiving a message configured for the CBF, the message including a first indication of a dynamic communication range for the CBF, where the dynamic communication range is less than or equal to the maximum communication range. The operations of 1210 may be performed in accordance with examples as disclosed herein. In some examples, aspects of the operations of 1210 may be performed by a message reception component 830 as described with reference to FIG. 8.

At 1215, the method may include transmitting the message with a message header including a second indication of the dynamic communication range to one or more neighboring stations based on a timer associated with the dynamic communication range the message. The operations of 1215 may be performed in accordance with examples as disclosed herein. In some examples, aspects of the operations of 1215 may be performed by a communication range indication component 845 or a message relaying component 835, or both, as described with reference to FIG. 8.

The following provides an overview of aspects of the present disclosure:

Aspect 1: A method for wireless communications at a UE, comprising: receiving signaling indicating a configuration for contention-based forwarding associated with a maximum communication range for contention-based forwarding signaling; receiving a message configured for the contention-based forwarding, the message including a first indication of a dynamic communication range for the contention-based forwarding, wherein the dynamic communication range is less than or equal to the maximum communication range; and transmitting the message to one or more neighboring stations based at least in part on a timer associated with the dynamic communication range, wherein the message includes a second indication of the dynamic communication range.

Aspect 2: The method of aspect 1, further comprising: determining the dynamic communication range based at least in part on a Quality of Service (QoS) range corresponding to a QoS profile of the message.

Aspect 3: The method of any of aspects 1 through 2, wherein transmitting the message comprises: transmitting the message with a message header including the second indication of the dynamic communication range.

Aspect 4: The method of any of aspects 1 through 3, wherein transmitting the message comprises: transmitting a distance-based broadcast transmission including the message to the one or more neighboring stations.

Aspect 5: The method of any of aspects 1 through 4, wherein transmitting the message comprises: determining the timer associated with the dynamic communication range has expired; and transmitting the message to the one or more neighboring stations based at least in part on expiration of the timer.

Aspect 6: The method of any of aspects 1 through 5, further comprising: determining a minimum delay timer based at least in part on the dynamic communication range for the contention-based forwarding, wherein the minimum delay timer is the timer.

Aspect 7: The method of any of aspects 1 through 6, wherein transmitting the message comprises: transmitting the message including the second indication of the dynamic communication range and an indication of the maximum communication range, wherein the timer is determined according to the dynamic communication range, and a range for the message corresponds to the maximum communication range.

Aspect 8: The method of any of aspects 1 through 7, further comprising: determining the dynamic communication range for the contention-based forwarding based at least in part on a network-configured transmission distance configuration.

Aspect 9: The method of any of aspects 1 through 8, wherein the maximum communication range is a theoretical maximum communication range for the contention-based forwarding.

Aspect 10: The method of any of aspects 1 through 9, wherein transmitting the message to the one or more neighboring stations comprises: transmitting a vehicle-to-anything (V2X) message to one or more neighboring V2X UEs, wherein the UE is a V2X UE.

Aspect 11: An apparatus for wireless communications at a UE, comprising a processor; memory coupled with the processor; and instructions stored in the memory and executable by the processor to cause the apparatus to perform a method of any of aspects 1 through 10.

Aspect 12: An apparatus for wireless communications at a UE, comprising at least one means for performing a method of any of aspects 1 through 10.

Aspect 13: A non-transitory computer-readable medium storing code for wireless communications at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving signaling indicating a configuration for contention-based forwarding associated with a maximum communication range for contention-based forwarding signaling;
   receiving a message configured for the contention-based forwarding, the message including a first indication of a dynamic communication range for the contention-based forwarding, wherein the dynamic communication range is less than or equal to the maximum communication range; and
   transmitting the message to one or more neighboring stations based at least in part on a timer associated with the dynamic communication range, wherein the message includes a second indication of the dynamic communication range.

2. The method of claim 1, further comprising:
   determining the dynamic communication range based at least in part on a Quality of Service (QoS) range corresponding to a QoS profile of the message.

3. The method of claim 1, wherein transmitting the message comprises:
   transmitting the message with a message header including the second indication of the dynamic communication range.

4. The method of claim 1, wherein transmitting the message comprises:
   transmitting a distance-based broadcast transmission including the message to the one or more neighboring stations.

5. The method of claim 1, wherein transmitting the message comprises:
   determining the timer associated with the dynamic communication range has expired; and
   transmitting the message to the one or more neighboring stations based at least in part on expiration of the timer.

6. The method of claim 1, further comprising:
   determining a minimum delay timer based at least in part on the dynamic communication range for the contention-based forwarding, wherein the minimum delay timer is the timer.

7. The method of claim 1, wherein transmitting the message comprises:
   transmitting the message including the second indication of the dynamic communication range and an indication of the maximum communication range, wherein the timer is determined according to the dynamic communication range, and a range for the message corresponds to the maximum communication range.

8. The method of claim 1, further comprising:
   determining the dynamic communication range for the contention-based forwarding based at least in part on a network-configured transmission distance configuration.

9. The method of claim 1, wherein the maximum communication range is a theoretical maximum communication range for the contention-based forwarding.

10. The method of claim 1, wherein transmitting the message to the one or more neighboring stations comprises:
    transmitting a vehicle-to-anything (V2X) message to one or more neighboring V2X UEs, wherein the UE is a V2X UE.

11. An apparatus for wireless communications at a user equipment (UE), comprising:
    a processor;
    memory coupled with the processor; and
    instructions stored in the memory and executable by the processor to cause the apparatus to:
      receive signaling indicating a configuration for contention-based forwarding associated with a maximum communication range for contention-based forwarding signaling;
      receive a message configured for the contention-based forwarding, the message including a first indication of a dynamic communication range for the contention-based forwarding, wherein the dynamic communication range is less than or equal to the maximum communication range; and
      transmit the message to one or more neighboring stations based at least in part on a timer associated with the dynamic communication range, wherein the message includes a second indication of the dynamic communication range.

12. The apparatus of claim 11, wherein the instructions are further executable by the processor to cause the apparatus to:
    determine the dynamic communication range based at least in part on a Quality of Service (QoS) range corresponding to a QoS profile of the message.

13. The apparatus of claim 11, wherein the instructions to transmit the message are executable by the processor to cause the apparatus to:
    transmit the message with a message header including the second indication of the dynamic communication range.

14. The apparatus of claim 11, wherein the instructions to transmit the message are executable by the processor to cause the apparatus to:
    transmit a distance-based broadcast transmission including the message to the one or more neighboring stations.

15. The apparatus of claim 11, wherein the instructions to transmit the message are executable by the processor to cause the apparatus to:
    determine the timer associated with the dynamic communication range has expired; and
    transmit the message to the one or more neighboring stations based at least in part on expiration of the timer.

16. The apparatus of claim 11, wherein the instructions are further executable by the processor to cause the apparatus to:
    determine a minimum delay timer based at least in part on the dynamic communication range for the contention-based forwarding, wherein the minimum delay timer is the timer.

17. The apparatus of claim 11, wherein the instructions to transmit the message are executable by the processor to cause the apparatus to:
    transmit the message including the second indication of the dynamic communication range and an indication of the maximum communication range, wherein the timer is determined according to the dynamic communication range, and a range for the message corresponds to the maximum communication range.

18. The apparatus of claim 11, wherein the instructions are further executable by the processor to cause the apparatus to:
    determine the dynamic communication range for the contention-based forwarding based at least in part on a network-configured transmission distance configuration.

19. The apparatus of claim 11, wherein the maximum communication range is a theoretical maximum communication range for the contention-based forwarding.

20. The apparatus of claim 11, wherein the instructions to transmit the message to the one or more neighboring stations are executable by the processor to cause the apparatus to:
    transmit a vehicle-to-anything (V2X) message to one or more neighboring V2X UEs, wherein the UE is a V2X UE.

21. An apparatus for wireless communications at a user equipment (UE), comprising:
    means for receiving signaling indicating a configuration for contention-based forwarding associated with a maximum communication range for contention-based forwarding signaling;
    means for receiving a message configured for the contention-based forwarding, the message including a first indication of a dynamic communication range for the contention-based forwarding, wherein the dynamic communication range is less than or equal to the maximum communication range; and
    means for transmitting the message to one or more neighboring stations based at least in part on a timer associated with the dynamic communication range, wherein the message includes a second indication of the dynamic communication range.

22. The apparatus of claim 21, further comprising:
    means for determining the dynamic communication range based at least in part on a Quality of Service (QoS) range corresponding to a QoS profile of the message.

23. The apparatus of claim 21, wherein the means for transmitting the message comprise:
    means for transmitting the message with a message header including the second indication of the dynamic communication range.

24. The apparatus of claim 21, wherein the means for transmitting the message comprise:
    means for transmitting a distance-based broadcast transmission including the message to the one or more neighboring stations.

25. The apparatus of claim 21, wherein the means for transmitting the message comprise:
    means for determining the timer associated with the dynamic communication range has expired; and
    means for transmitting the message to the one or more neighboring stations based at least in part on expiration of the timer.

26. The apparatus of claim 21, further comprising:
    means for determining a minimum delay timer based at least in part on the dynamic communication range for the contention-based forwarding, wherein the minimum delay timer is the timer.

27. The apparatus of claim 21, wherein the means for transmitting the message comprise:
    means for transmitting the message including the second indication of the dynamic communication range and an indication of the maximum communication range, wherein the timer is determined according to the dynamic communication range, and a range for the message corresponds to the maximum communication range.

28. The apparatus of claim 21, further comprising:
    means for determining the dynamic communication range for the contention-based forwarding based at least in part on a network-configured transmission distance configuration.

29. The apparatus of claim 21, wherein the maximum communication range is a theoretical maximum communication range for the contention-based forwarding.

30. A non-transitory computer-readable medium storing code for wireless communications at a user equipment (UE), the code comprising instructions executable by a processor to:
    receive signaling indicating a configuration for contention-based forwarding associated with a maximum communication range for contention-based forwarding signaling;
    receive a message configured for the contention-based forwarding, the message including a first indication of a dynamic communication range for the contention-based forwarding, wherein the dynamic communication range is less than or equal to the maximum communication range; and
    transmit the message to one or more neighboring stations based at least in part on a timer associated with the dynamic communication range, wherein the message includes a second indication of the dynamic communication range.

* * * * *